United States Patent Office 3,314,989
Patented Apr. 18, 1967

3,314,989
PROCESS OF PREPARING N-METHYL-5-NITROISOPHTHALAMIC ACID
Lawrence A. Patterson and George Brooke Hoey, Ferguson, Mo., assignors to Mallinckrodt Chemical Works, St. Louis, Mo., a corporation of Missouri
No Drawing. Filed July 1, 1963, Ser. No. 292,165
11 Claims. (Cl. 260—518)

This invention relates to the preparation of amides and more particularly to the preparation of 5-substituted N-methylisophthalamic acids.

Briefly the invention is directed to the preparation of N-methyl-5-nitroisophthalamic acid through the acidolysis of an N-methyl amide with 5-nitroisophthalic acid.

N-methyl-5-nitroisophthalamic acid is an important intermediate in the preparation of iothalamic acid (5-acetamido-2,4,6-triiodo-N-methylisophthalamic acid) and other useful X-ray contrast agents. The conventional method of preparing iothalamic acid as disclosed in the co-pending, co-assigned application of George Brooke Hoey, Ser. No. 119,287, filed June 26, 1961, now Patent No. 3,145,197, dated August 18, 1964, involves the following sequence of reactions:

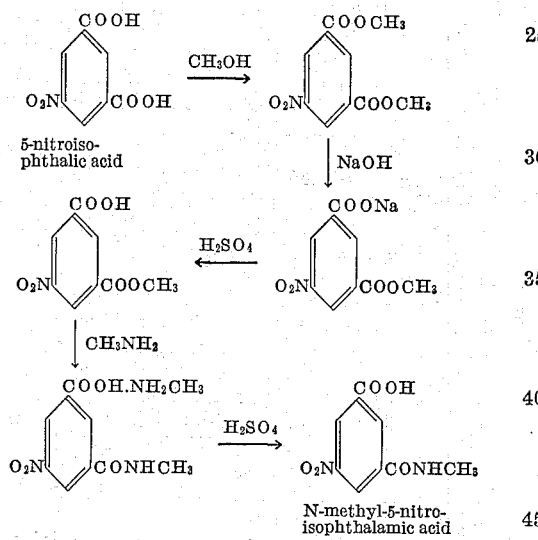

It will be seen that in this conventional five-step process, three synthetic organic transformations and two acidifications are involved in the conversion of 5-nitroisophthalic acid to N-methyl-5-nitroisophthalamic acid. It is obvious that a simple direct process for the conversion of 5-nitroisophthalic acid to N-methyl-5-nitroisophthalamic acid in high yield would have a considerable economic advantage over the above process.

Among the objects of the invention may be mentioned the provision of improved processes for the preparation of N-methyl-5-nitroisophthalamic acid; the provision of processes for the direct conversion of 5-nitroisophthalic acid to N-methyl-5-nitroisophthalamic acid; the provision of processes of the type mentioned which comprise the acidolysis of an N-methyl amide with 5-nitroisophthalic acid; the provision of processes of the type mentioned which permit easy separation of the principal product from unreacted starting materials and by-products; and the provision of processes of the type mentioned which include recycling of unreacted starting materials and by-products for improved yields. Other objects and features will be in part apparent and in part pointed out hereinafter.

The invention accordingly comprises the methods hereinafter described, the scope of the invention being indicated in the following claims.

In accordance with the invention, it has now been found that N-methyl-5-nitroisophthalamic acid may be prepared in high yields by a process which comprises the acidolysis of an N-methyl amide with 5-nitroisophthalic acid. The reaction may be carried out by heating a mixture of the dry reactants above fusion temperature or by carrying out the reaction in a high-boiling inert liquid, such as nitrobenzene.

N,N'-dimethylurea is a suitable N-methyl amide for use in the process, and because of its low cost and commercial availability, as well as the high yields obtainable with it, is a preferred amide. However, other N-methyl amides, such as N-methylformamide, N-methylacetamide and N-methylpropionamide, may be used if desired. Also, as will be evident from what follows, N,N'-dimethyl-5-nitroisophthalamide is particularly useful.

The desired course of the reaction between dimethylurea and 5-nitroisophthalic acid as contemplated by this invention may be represented as follows:

(1)
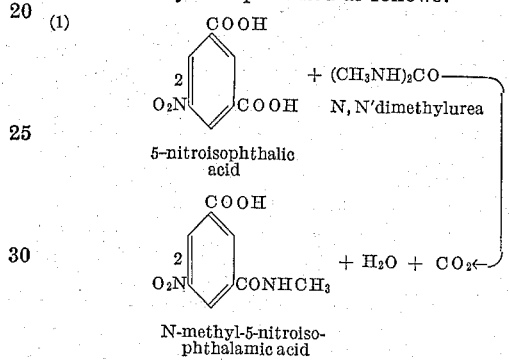

As is indicated by Equation 1, a mole of N,N'-dimethylurea could theoretically convert two moles of 5-nitroisophthalic acid to N-methyl-5-nitroisophthalamic acid. However, the yield of N-methyl-5-nitroisophthalamic acid is reduced by the following side reaction:

(2)
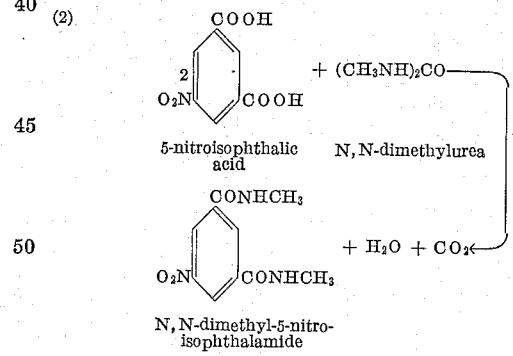

It will be noted from Equation 2 that each mole of N,N'-dimethylurea consumed in the side reaction reacts with only one mole of 5-nitroisophthalic acid to form the diamide. Consequently if stoichiometric quantities of 5-nitroisophthalic acid and N,N'-dimethylurea are used in accordance with Equation 1, for each mole of N,N'-dimethyl-5-nitroisophthalamide formed, an equivalent mole of unreacted 5-nitroisophthalic acid will remain.

The usual acidolysis reaction product, therefore, comprises a mixture of N-methyl-5-nitroisophthalamic acid, N,N' - dimethyl - 5 - nitroisophthalamide and 5 - nitroisophthalic acid.

Two significant aspects of this particular acidolysis reaction mixture, however, make possible the achievement of increased over-all yields of N-methyl-5-nitroisophthalamic acid by the process of the invention. The first is the solubility characteristics of the three major compoents of the mixture, which render possible the separation of the components by relatively simple and inexpensive means. 5-Nitroisophthalic acid is reasonably soluble in hot water, whereas the other two components are essentially insoluble therein. Leaching of the reaction mixture with hot water therefore results in the selective dissolution of the unreacted 5-nitroisophthalic acid, leaving the other two components undissolved. While this leach may be accomplished with plain hot water, it is usually advisable to acidify the leach water as a precaution against partially dissolving the N-methyl-5-nitroisophthalamic acid, which is soluble in an alkaline medium. When the hot 5-nitroisophthalic acid leach solution is cooled the 5-nitroisophthalic acid largely crystallizes and may be readily recovered. If desired, the mother liquor may be boiled down for further recovery of 5-nitroisophthalic acid.

Following removal of the 5-nitroisophthalic acid the remaining N-methyl-5-nitroisophthalamic acid and N,N'-dimethyl-5-nitroisophthalamide are easily separated. Since N-methyl-5-nitroisophthalamic acid contains a salt-forming carboxyl group, it is soluble in alkaline aqueous media. In contradistinction, the N,N'-dimethyl-5-nitroisophthalamide is insoluble in such media. Therefore, the separation of the remaining components is readily accomplished by means of an alkaline aqueous leach. While a sodium hydroxide or sodium carbonate solution is ordinarily used for the purpose, alkaline solutions of other cation forming water soluble salts of N-methyl-5-nitroisophthalamic acid may also be used. After leaching, the N-methyl-5-nitroisophthalamic acid is readily recovered by acidifying the alkaline leachate to precipitate the free acid.

The residue of N,N'-dimethyl-5-nitroisophthalamide remaining from the two leach operations is sufficiently pure for further use, as discussed below.

The second significant factor that permits the achievement of increased yields is the fact that the recovered 5-nitroisophthalic acid and N,N'-dimethyl-5-nitroisophthalamide may be recycled in the process. Since the by-product N,N'-dimethyl-5-nitroisophthalamide is in itself an N-methyl amide it is susceptible to acidolysis by 5-nitroisophthalic acid with the formation of N-methyl-5-nitroisophthalamic acid, in accordance with the invention. Preferably, a small volume of molten reaction medium is initially provided by heating N,N'-dimethylurea and 5-nitroisophthalic acid, to which are then added N,N'-dimethyl-5-nitroisophthalamide and appropriate additional quantities of 5-nitroisophthalic acid. The acidolysis of N,N'-dimethyl-5-nitroisophthalamide by 5-nitroisophthalic acid proceeds according to Equation 3.

(3)
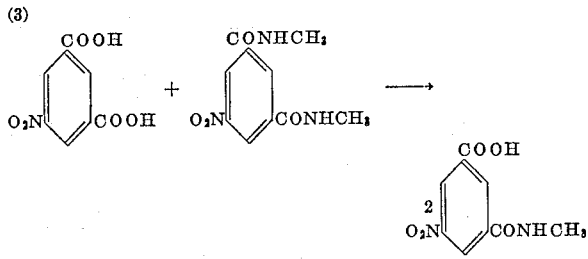

It will be noted from Equation 1 that each mole of N,N'-dimethylurea effectively provides two moles of $CH_3NH-$ groups for conversion of 5-nitroisophthalic acid. By the same token, from Equation 3, it will be seen that each mole of N,N'-dimethyl-5-nitroisophthamide effectively provides only one mole of $CH_3NH-$ groups for the same purpose. Preferably, the molar ratio of N,N'-dimethyl-5-nitroisophthalamide to 5-nitroisophthalic acid in the Equation 3 reaction is between approximately 1 and approximately 1.5.

While theoretically, sufficient N-methyl amide to provide a half mole of $CH_3NH-$ groups per mole of 5-nitroisophthalic acid is required in accordance with Equation 1, in practice sufficient N-methyl amide to provide, effectively, about 0.5 to about 0.75 mole of $CH_3NH-$ groups per mole of 5-nitroisophthalic acid is preferably employed. At effective $CH_3NH-$/5-nitroisophthalic acid ratios of approximately 0.5, little N,N'-dimethyl-5-nitroisophthalamide is formed as a by-product. As the proportion of N-methyl amide is increased the yield of N-methyl-5-nitroisophthalamic acid is increased and there is also an increased yield of N,N'-dimethyl-5-nitroisophthalamide.

The reaction is preferably carried out at a temperature of approximately 180 to 200° C., although temperatures as high as 220° C. may be used.

The following examples illustrate the invention.

EXAMPLE 1

*Acidolysis of N,N'-dimethylurea with 5-nitroisophthalic acid*

N,N'-dimethylurea (33 g.) is heated to approximately 180° C. and 5-nitroisophthalic acid (152 g.) is added in portions such that a molten reaction mixture is maintained at a temperature in the range of 180–200° C. Additional portions of N,N'-dimethylurea and 5-nitroisophthalic acid are added to the reaction mixture alternately in the ratio (by weight) of approximately 1 part N,N'-dimethylurea to 5 parts 5-nitroisophthalic acid, the temperature of the mixture being kept preferably in the range of 190°–200° C., until a total of 760 g. (3.53 moles) of 5-nitroisophthalic acid and 158 g. (1.8 moles) of N,N'-dimethylurea have been charged. Following the last addition, the acidolysis reaction mixture is heated for an additional hour at 190–200° C. and is then poured into a tray and allowed to cool and solidify.

The acidolysis reaction product (809 g.) from the preceding step is slurried in hot water (2.7 l.), and the slurry is acidified (with sulfuric acid), heated to 90° C. and filtered. The filter cake is washed well with hot water and the combined leach liquors are set aside for recovery of the dissolved 5-nitroisophthalic acid.

The wet filter cake from the acid wash is slurried in water (1.3 l.), and the slurry is made slightly alkaline by the careful addition of sodium hydroxide solution. The alkaline slurry is filtered and washed to separate the dissolved sodium N-methyl-5-nitroisophthalamate from the undissolved N,N'-dimethyl-5-nitroisophthalamide.

The wet filter cake of N,N'-dimethyl-5-nitroisophthalamide is dried and set aside for further use as described in Example 2. Yield of N,N'-dimethyl-5-nitroisophthalamide, 73 g.

The pregnant liquor and washings containing sodium N-methyl-5-nitroisophthalamate are combined and acidified (sulfuric acid), the hot slurry is filtered, and the filter cake is dried. Yield of 5-nitro-N-methylisophthalamic acid, 290 g. M.P., 243.2–246° C. Neutral equivalent: found, 226.8; calculated, 224.

The hot leach liquor from the acid leach of the acidolysis reaction product is agitated and cooled to room temperature. The precipitated 5-nitroisophthalic acid is collected, washed and dried. Yield of recovered 5-nitroisophthalic acid, 348 g. This may be recycled in the above process or used as described in Example 2.

EXAMPLE 2

*Acidolysis of N,N'-dimethyl-5-nitroisophthalamide with 5-nitroisophthalic acid*

N,N'-dimethylurea (4.4 g.) is heated to 180° C. and 5-nitroisophthalic acid (21.1 g.) is added in small portions, the reaction temperature being maintained between 180 and 200° C. N,N'-dimethyl-5-nitroisophthalamide (71.2 g.) and 5-nitroisophthalic acid (63.5 g.) are then charged into the reaction mixture in small approximately equal portions, the reaction temperature being maintained in the range of 190–200° C. The reaction mixture is then heated an additional hour at 190–200° C., after which the desired N-methyl-5-nitroisophthalamic acid and the unreacted N,N'-dimethyl-5-nitroisophthalamide and 5-nitroisophthalic acid are separated and isolated as described in Example 1.

Yield:
N-methyl-5-nitroisophthalamic acid, 36.6 g.
M.P., 242.1–243.9° C. N.E., 223.
Recovered 5-nitroisophthalic acid, 54.7 g.
Recovered N,N'-dimethyl-5-nitroisophthalamide, 46.3 g.

The recovered 5-nitroisophthalic acid and N,N'-dimethyl-5-nitroisophthalamide may be recycled.

By the use of recycling as indicated, the process produces an over-all yield of N-methyl-5-isophthalamic acid of approximately 78%, calculated on the basis of 5-nitroisophthalic acid consumed.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. The method which comprises heating together 5-nitroisophthalic acid and an N-methyl amide selected from the group consisting of N,N'-dimethylurea and N,N'-dimethyl-5-nitroisophthalamide, to form N-methyl-5-nitroisophthalamic acid.

2. The method which comprises heating together 5-nitroisophthalic acid and N,N'-dimethylurea to form N-methyl-5-nitroisophthalamic acid.

3. The method which comprises heating together 5-nitroisophthalic acid and N,N'-dimethylurea at a temperature between approximately 180° C. and 220° C. to form N-methyl-5-nitroisophthalamic acid.

4. The method which comprises heating together 5-nitroisophthalic acid and N,N'-dimethylurea at a temperature between approximately 180° C. and 220° C. to form N-methyl-5-nitroisophthalamic acid, the molar ratio of N,N'-dimethylurea to 5-nitroisophthalic acid being between approximately 0.5 and 0.75, and thereafter isolating the N-methyl-5-nitroisophthalamic acid from the reaction mixture.

5. The method which comprises heating together 5-nitroisophthalic acid and N,N'-dimethyl-5-nitroisophthalamide to form N-methyl-5-nitroisophthalamic acid.

6. The method which comprises heating together 5-nitroisophthalic acid and N,N'-dimethyl-5-nitroisophthalamide at a temperature between approximately 180° C. and 220° C. to form N-methyl-5-nitroisophthalamic acid.

7. The method which comprises heating together 5-nitroisophthalic acid and N,N'-dimethyl-5-nitroisophthalamide at a temperature between approximately 180° C. and 220° C. to form N-methyl-5-nitroisophthalamic acid, the molar ratio of N,N'-dimethyl-5-nitroisophthalamide to 5-nitroisophthalic acid being between approximately 1 and 1.5, and thereafter isolating the N-methyl-5-nitroisophthalamic acid from the reaction mixture.

8. The method which comprises heating together 5-nitroisophthalic acid and N,N'-dimethylurea, permitting the molten reaction mixture to solidify, selectively dissolving the unreacted 5-nitroisophthalic acid in a non-alkaline aqueous medium, then selectively dissolving the N-methyl-5-nitroisophtalamic acid as a water soluble salt, and thereafter isolating the N-methyl-5-nitroisophthalamic acid.

9. The method which comprises heating together 5-nitroisophthalic acid and N,N'-dimethylurea at a temperature between approximately 180° C. and 220° C., the molar ratio of N,N'-dimethylurea to 5-nitroisophthalic acid being between approximately 0.5 and 0.75, permitting the molten reaction mixture to solidify, selectively dissolving the unreacted 5-nitroisophthalic acid in a non-alkaline aqueous medium, then selectively dissolving the N-methyl-5-nitroisophthalamic acid as a water soluble salt, and thereafter isolating the N-methyl-5-nitroisophthalamic acid.

10. The method which comprises heating together 5-nitroisophthalic acid and an N-methyl amide selected from the group consisting of N,N'-dimethylurea and N,N'-dimethyl-5-nitroisophthalamide, in amounts sufficient to provide effectively about 0.5 to about 0.75 mole of $CH_3NH$-groups per mole of acid, sepraately isolating from the reaction mixture 5-nitroisophthalic acid, N-methyl-5-nitroisophthalamic acid and N,N'-dimethyl-5-nitroisophthalamide, and recycling the recovered 5-nitroisophthalic acid and N,N'-dimethyl-5-nitroisophthalamide to produce additional N-methyl-5-nitroisophthalamic acid.

11. The method which comprises heating together 5-nitroisophthalic acid and N,N'-dimethylurea, the molar ratio of N,N'-dimethylurea to acid being in the range of approximately 0.5 to 0.75, at a temperature in the range of approximately 180° C. to 220° C., permitting the molten reaction mixture to solidify, selectively dissolving the unreacted 5-nitroisophthalic acid in a non-alkaline aqueous medium, then selectively dissolving the N-methyl-5-nitroisophthalamic acid as a water soluble salt, separately isolating 5-nitroisophthalic acid, N-methyl-5-nitroisophthalamic acid, and N,N'-dimethyl-5-nitroisophthalamide, heating together the recovered 5-nitroisophthalic acid and N,N'-dimethyl-5-nitroisophthalamide, and thereafter isolating additional N-methyl-5-nitroisophthalamic acid from the last named reaction mixture.

References Cited by the Examiner

UNITED STATES PATENTS 2,300,992  11/1942  Tabern _____ 260—518

LORRAINE A. WEINBERGER, *Primary Examiner.*

D. D. HORWITZ, L. A. THAXTON,
*Assistant Examiners.*